(12) United States Patent
Slabaugh et al.

(10) Patent No.: US 7,824,552 B2
(45) Date of Patent: Nov. 2, 2010

(54) MOBILE SYSTEMS AND METHODS OF SUFFICIENTLY TREATING WATER SO THAT THE TREATED WATER MAY BE UTILIZED IN WELL-TREATMENT OPERATIONS

(75) Inventors: Billy F. Slabaugh, Duncan, OK (US); Arron L. Karcher, Duncan, OK (US); Michael J. R. Segura, Duncan, OK (US); Randy S. Rosine, Duncan, OK (US); Max L. Phillippi, Duncan, OK (US); Donna L. Harris, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 392 days.

(21) Appl. No.: 11/899,299

(22) Filed: Sep. 5, 2007

(65) Prior Publication Data

US 2009/0057237 A1    Mar. 5, 2009

(51) Int. Cl.
*C02F 1/52* (2006.01)
*C02F 1/58* (2006.01)

(52) U.S. Cl. .............. 210/709; 166/267; 166/308.1; 210/712; 210/724; 210/726; 210/727; 210/787

(58) Field of Classification Search .............. 210/708
See application file for complete search history.

(56) References Cited

U.S. PATENT DOCUMENTS 3,753,900 A * 8/1973 Moore .................. 210/711

4,261,833 A * 4/1981 Pohl et al. .................. 210/639

(Continued)

FOREIGN PATENT DOCUMENTS

EP    1 468 964 A1    10/2004

(Continued)

OTHER PUBLICATIONS

Tao et al., "Conversion of Oilfield Produced Water Into an Inrrigation/Drinking Quality Water", SPE 26003, 1993, pp. 571-578.*

(Continued)

*Primary Examiner*—Peter A Hruskoci
(74) *Attorney, Agent, or Firm*—Robert A. Kent; Booth Albanesi Schroeder LLC

(57) ABSTRACT

A system is provided that includes: (a) a mobile platform; (b) an input pump operatively connected to be capable of pumping a treatment stream through the system; (c) a centrifugal separator operatively connected downstream of the input pump to centrifugally treat the treatment stream; (d) a borate filter operatively connected downstream of the centrifugal separator to filter the treatment stream capable of removing at least some of a borate when the treatment stream is at a pH of 8 or above; and (e) a chemical-additive subsystem operatively connected to be capable of: (i) selectively adding one or more chemical agents to the treatment stream upstream of the centrifugal separator, wherein the chemical agents can be selected to be capable of precipitating dissolved ions selected from the group consisting of: sulfate, calcium, strontium, or barium, magnesium, iron; and (ii) selectively adding a chemical agent to the treatment stream upstream of the borate filter to increase the pH of the treatment stream to 8 or above.

18 Claims, 5 Drawing Sheets

U.S. PATENT DOCUMENTS

| | | | |
|---|---|---|---|
| 5,250,185 A * | 10/1993 | Tao et al. | 210/654 |
| 5,879,562 A * | 3/1999 | Garbutt | 210/718 |
| 6,036,867 A * | 3/2000 | Jogand et al. | 210/696 |
| 6,059,974 A * | 5/2000 | Scheurman, III | 210/662 |
| 6,117,333 A * | 9/2000 | Frankiewicz et al. | 210/705 |
| 6,478,971 B1 * | 11/2002 | Koefod et al. | 210/714 |
| 7,442,309 B2 * | 10/2008 | Wilf et al. | 210/652 |
| 7,520,993 B1 * | 4/2009 | Laraway et al. | 210/652 |
| 2006/0186050 A1 * | 8/2006 | Hanes et al. | 210/670 |

FOREIGN PATENT DOCUMENTS

| | | |
|---|---|---|
| WO | WO 03/106348 A1 | 12/2003 |
| WO | WO 2007/066070 A1 | 6/2007 |

OTHER PUBLICATIONS

Cynthia Murray-Gulde, et al. Paper Entitled: "Performance of a Hybrid Reverse Osmosis-Constructed Wetland Treatment System for Brackish Oil Field Produced Water", Jul. 12, 2002.

International Search Report and Written Opinion of Application No. PCT/GB2008/0029784, Mar. 9, 2008.

* cited by examiner

MOBILE SYSTEMS AND METHODS OF SUFFICIENTLY TREATING WATER SO THAT THE TREATED WATER MAY BE UTILIZED IN WELL-TREATMENT OPERATIONS

CROSS-REFERENCE TO RELATED APPLICATIONS

Not applicable

STATEMENT REGARDING FEDERALLY SPONSORED RESEARCH OR DEVELOPMENT

Not Applicable.

REFERENCE TO A MICROFICHE APPENDIX

Not applicable.

TECHNICAL FIELD

The present invention generally relates to mobile systems and methods for the treatment of water so that it may be used in well-treatment operations.

SUMMARY OF THE INVENTION

According to one aspect of the invention, a mobile water treatment system for sufficiently treating water so that the treated water may be utilized in well-treatment operations is provided. The system comprises:

(a) a mobile platform;

(b) an input pump, wherein the input pump is mounted on the mobile platform and operatively connected to be capable of pumping a treatment stream through the system;

(c) a centrifugal separator, wherein the centrifugal separator is mounted on the mobile platform and operatively connected downstream of the input pump to centrifugally treat the treatment stream;

(d) a borate filter, wherein the borate filter is mounted on the mobile platform and operatively connected downstream of the centrifugal separator to filter the treatment stream, and wherein the borate filter is capable of removing at least some of a borate that may be present in the treatment stream when the treatment stream is at a pH of 8 or above; and (e) a chemical-additive subsystem, wherein the subsystem is mounted on the mobile platform, and wherein the subsystem is operatively connected to be capable of:

(i) selectively adding one or more chemical agents to the treatment stream upstream of the centrifugal separator, wherein the chemical agents can be selected to be capable of precipitating dissolved ions selected from the group consisting of: sulfate, calcium, strontium, or barium, magnesium, iron, and any combination thereof in any proportion that may be present in the treatment stream; and (ii) selectively adding a chemical agent to the treatment stream upstream of the borate filter to increase the pH of the treatment stream to 8 or above, wherein the pH increasing agent can be the same or different from one of the chemical agents that can be selected to be capable of precipitating dissolved sulfate, calcium, strontium, or barium, magnesium, or iron ions.

According to another aspect of the invention, a method of water treatment for sufficiently treating water so that the treated water may be utilized in well-treatment operations is provided. According to this aspect, the method comprises the steps of: bringing a mobile water treatment system according to the invention to a source of water; and using the mobile water treatment system to treat water to obtain treated water.

According to yet another aspect of the invention, a method of water treatment for sufficiently treating water so that the treated water may be utilized in well-treatment operations, wherein the method comprises the steps of:

(a) pumping water as part of a treatment stream;

(b) centrifugally removing at least some of the particulate that may be present in the treatment stream; and (c) filtering out at least some of the borate that may be present in the treatment stream with a filter media capable of removing a borate from the treatment stream at a pH of 8 or above, wherein at least during the step of filtering of borate, the pH of the treatment stream is or is adjusted to be 8 or above;

(d) chemically treating the treatment stream, wherein the step of chemically treating comprises at least one of the following steps:

(i) adding a water-soluble calcium, strontium, or barium halide to the treatment stream upstream of the centrifugally removing step, wherein the calcium, strontium, or barium halide is capable of precipitating at least some of the sulfate ions dissolved in the treatment stream as calcium, strontium, or barium sulfate;

(ii) adding a water-soluble carbonate to the treatment stream upstream of the centrifugally removing step, wherein the carbonate is capable of precipitating at least some of the calcium ions dissolved in the treatment stream as calcium carbonate;

(iii) adding a water-soluble alkali metal hydroxide to the treatment stream upstream of the centrifugally removing step, wherein the hydroxide is capable of precipitating at least some of the magnesium and iron ions dissolved in the treatment stream as magnesium and iron hydroxide; and (iv) adding a pH increasing agent to the treatment stream upstream of the borate filtering step, wherein the pH increasing agent is capable of increasing the pH of the treatment stream to at least 8, and wherein the pH increasing agent can be the same or different from one of the chemical agents selected to be capable of precipitating dissolved calcium, strontium, or barium, magnesium, or iron ions.

According to another aspect of the invention, a method of water treatment for sufficiently treating water so that the treated water may be utilized in well-treatment operations is provided, wherein the method comprises the steps of:

(a) pumping water as part of a treatment stream;

(b) centrifugally removing at least some of the particulate that may be present in the treatment stream;

(c) filtering out at least some of the borate that may be present in the treatment stream with a filter media capable of removing a borate from the treatment stream at a pH of 8 or above, wherein at least during the step of filtering of borate, the pH of the treatment stream is or is adjusted to be 8 or above;

(d) adding a water-soluble calcium, strontium, or barium halide to the treatment stream upstream of the centrifugally removing step, wherein the calcium, strontium, or barium halide is capable of precipitating at least some of the sulfate ions dissolved in the treatment stream as calcium, strontium, or barium sulfate; and (e) adding a pH increasing agent to the treatment stream upstream of the borate filtering step, wherein the pH increasing agent is capable of increasing the pH of the treatment stream to at least 8.

This method preferably further includes the step of: adding a water-soluble alkali metal hydroxide to the treatment stream upstream of the centrifugally removing step, wherein the hydroxide is capable of precipitating at least some of the magnesium and iron ions dissolved in the treatment stream as magnesium and iron hydroxide.

According to another aspect of the invention, a method of water treatment for sufficiently treating water so that the treated water may be utilized in well-treatment operations is provided, wherein the method comprises the steps of:

(a) pumping water as part of a treatment stream;

(b) centrifugally removing at least some of the particulate that may be present in the treatment stream;

(c) filtering out at least some of the borate that may be present in the treatment stream with a filter media capable of removing a borate from the treatment stream at a pH of 8 or above, wherein at least during the step of filtering of borate, the pH of the treatment stream is or is adjusted to be 8 or above;

(d) adding a water-soluble carbonate to the treatment stream upstream of the centrifugally removing step, wherein the carbonate is capable of precipitating at least some of the calcium ions dissolved in the treatment stream as calcium carbonate; and (e) adding a pH increasing agent to the treatment stream upstream of the borate filtering step, wherein the pH increasing agent is capable of increasing the pH of the treatment stream to at least 8, and wherein the pH increasing agent can be the same or different from the carbonate selected to be capable of precipitating dissolved calcium ions.

This method preferably further includes the step of: adding a water-soluble alkali metal hydroxide to the treatment stream upstream of the centrifugally removing step, wherein the hydroxide is capable of precipitating at least some of the magnesium and iron ions dissolved in the treatment stream as magnesium and iron hydroxide, and wherein the pH increasing agent can be the same or different from the hydroxide selected to be capable of precipitating dissolved magnesium and iron ions.

According to the systems and methods of the invention, water can be treated to obtain treated water having a substantially reduced concentration of dissolved sulfate or calcium ions, preferably a substantially reduced concentration of magnesium and iron ions, and a substantially reduced concentration of dissolved borate ions. These and further aspects of the invention are described in more detail below.

BRIEF DESCRIPTION OF THE DRAWINGS

A more complete understanding of the present disclosure and advantages thereof may be acquired by referring to the following description taken in conjunction with the accompanying drawings, which.

DETAILED DESCRIPTION

Figure 1:
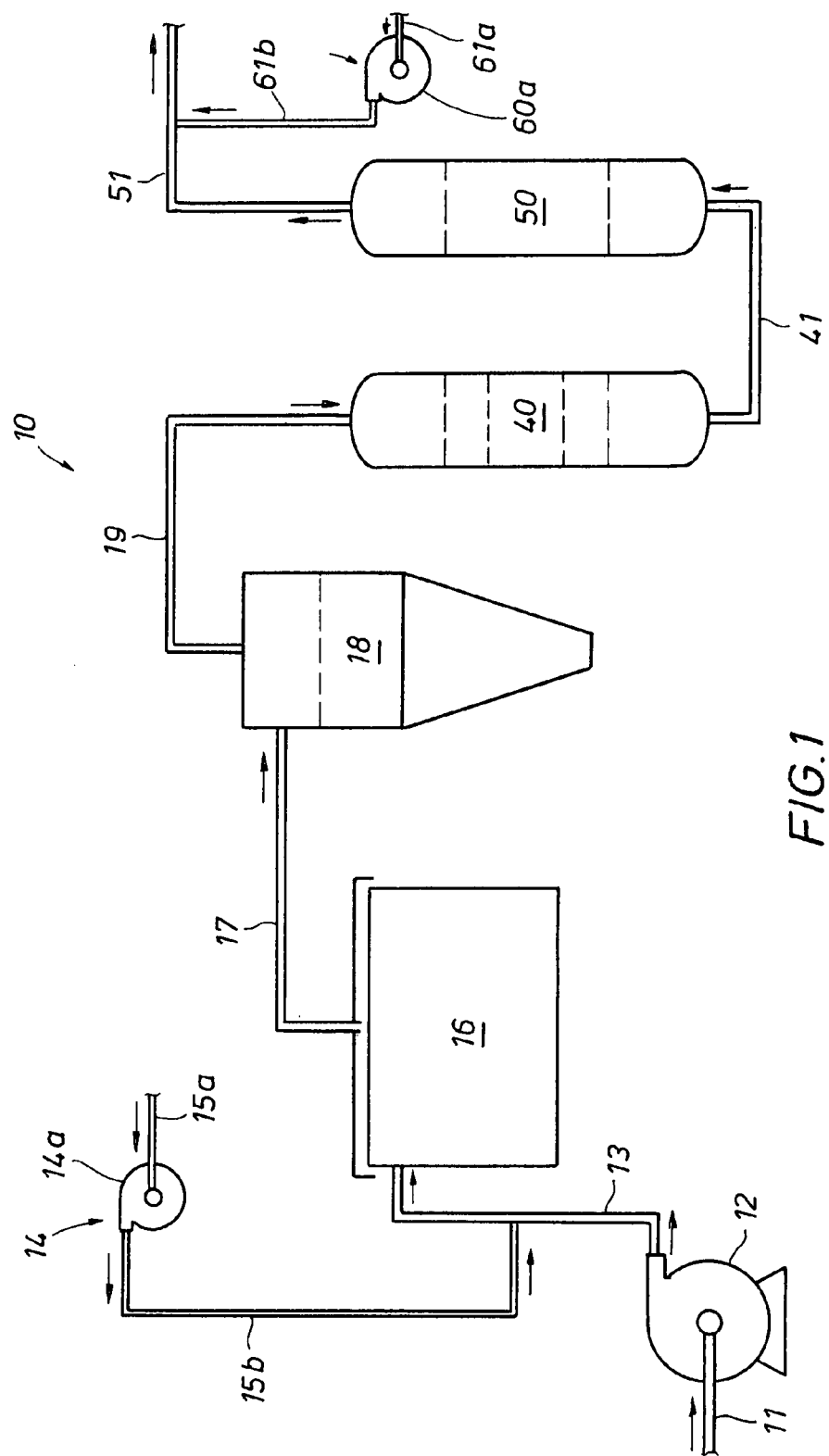
FIG. 1 is a flow diagram representing a presently preferred embodiment of a water treatment system for sufficiently treating water so that the treated water may be utilized in well-treatment operations.

Large quantities of water are required in well-treatment operations for producing oil and gas from subterranean formations. For example, a single well fracturing operation may require several millions of gallons of treatment water be injected into the well.

In the production of oil and gas, great quantities of water are produced. Sources of produced water can include water that may have been injected into the subterranean formation as part of a well-completion or well-treatment process, water that may have been injected as part of an injection-well driving process, connate water, and any mixture of any of these. For example, for every barrel of oil produced from a well, it is typical to also obtain about 10 barrels of produced water. Large quantities of produced water continue to be disposed of as waste water, for example, by reinjecting the produced water into a well.

With the rising demand for freshwater, increasing public concern for the environment, and with the rising costs of obtaining freshwater, it would be desirable to be able to use produced water in common well-treatment operations.

Produced water is brackish or saline water that may contain hydrocarbon and other materials. According to this invention, it is recognized that, in general, for water to be suitable for use in common well-treatment operations, however, does not require that it be seawater, freshwater, or potable water. Usually all that is required is water that does not contain materials that would be particularly detrimental to the chemistry involved in such well-treatment operations.

Of particular concern for use in common well-treatment operation is the avoidance of water containing undesirably-high concentrations of inorganic ions having a valence state of two or more. As is well known in the oil and gas industry, such ions can interfere with the chemistry of forming or breaking certain types of viscous fluids that are commonly in various well-treatment operations.

Cations that are of common concern include dissolved alkaline earth metal ions, particularly calcium and magnesium ions, and may also include dissolved iron ions.

An anion of common concern includes sulfate.

Normally, however, a high concentration of both calcium ions and sulfate anions in a water source is unlikely. Calcium ions tend to react with sulfate ions to produce calcium sulfate, which is an insoluble salt that tends to precipitate from solution. Similarly for strontium ions and sulfate ions or barium ions and sulfate ions. Thus, a problem with using water for common well-treatment operations tends to be either an undesirably-high concentration of calcium, strontium, or barium ions or an undesirably-high concentration of sulfate ions.

Borates have the chemical formula $B(OR)_3$, where B =boron, O=oxygen, and R=hydrogen or any organic group. At higher pH ranges, e.g., 8 or above, a borate is capable of increasing the viscosity of an aqueous solution of a water-soluble polymeric material such as a galactomannan or a polyvinyl alcohol. Afterwards, if the pH is lowered, e.g., below 8, the observed effect on increasing the viscosity of the solution can be reversed to reduce or "break" the viscosity back toward its original lower viscosity. It is also well known that at lower pH ranges, e.g., below 8, borate does not increase the viscosity of such a water-soluble polymeric material. This effect of borate and response to pH provides a commonly-used technique for controlling the cross-linking of certain polymeric viscosity-increasing agents. The control of increasing the viscosity of such fluids and the subsequent "breaking" of the viscosity tends to be sensitive to several factors, including the particular borate concentration in the solution.

Without being limited by any particular theoretical explanation, a borate is believed to be capable of forming labile bonds with two alcohol sites of other molecules. This ability of a borate to react with the alcohol sites can be employed to "cross-link" alcohol sites on different polymer molecules (or possibly other parts of the same molecule) that find their way in a solution to become adjacent to one another. The pH of an aqueous fluid controls the equilibrium between boric acid and borate anion in solution. At higher pH ranges, the equilibrium shifts toward a higher concentration of borate ion in the water.

For example, by increasing the pH of a fluid to 8 or above, although usually in the range of about 8.5-12, a borate-releasing compound such as boric acid releases borate ions, which become available for cross-linking a water-soluble polymer having alcohol sites. By subsequently lowering the pH of the fluid to a pH of below 8, for example, by adding or releasing an acid into the fluid, the equilibrium shifts such that less of the borate anion species is in solution, and the cross-linking can be broken, thereby returning such a gelled fluid to a much lower viscosity.

Regardless of the theoretical chemical mechanism of borate cross-linking, which may not yet have been perfectly elucidated and understood, borates are widely used in the oil and gas industry to selectively control an increase and subsequent break in the viscosity of an aqueous well-treatment fluid containing a water-soluble polymeric material having alcohol sites. A fluid having a viscosity greater than that of water can be useful in various well-treatment operations, such as in a fracturing a well where the increased viscosity is used to help carry a proppant through a wellbore to a desired location. After having served the intended purpose of a fluid having an increased viscosity, the viscosity of the fluid can be broken to help return the fluid back to the surface as some of the produced water. Therefore, borates are commonly found in produced water.

Borate cross-linking may be undesirable in some well-treatment operations, however, which may interfere with the desired chemistry for a particular well-treatment operation. Thus, the presence of borates or the presence of unknown concentrations of borates is often undesired.

Borates also may be naturally occurring in freshwater, seawater, and connate water, any of which may be found in treated wells, but usually in such low concentrations that the borates would not normally be expected to interfere with the chemistry of common well-treatment fluids. As borates are commonly used in various well-treatment fluids, however, undesirably high concentrations of borates are likely to be present in produced water.

According to the invention, it is recognized that treating produced water or other source of water to reduce any substantial concentrations of one or more of the dissolved sulfate, calcium, strontium, or barium, magnesium, and iron ions, and to reduce any substantial concentrations of borates, may obtain sufficiently treated water for use in many common well-treatment operations. More preferably, any substantial concentration of all of the dissolved sulfate, calcium, strontium, or barium, magnesium, and iron ions would be desirable. Of course, the treated water according to the systems and methods of the present invention would not be expected to be potable or suitable for other purposes. Saving the cost of unnecessary water purification for use of the water in other well-treatment operations, however, is expected to be of enormous economic and practical benefit.

As used herein, the words "comprise," "has," and "include" and all grammatical variations thereof are each intended to have an open, non-limiting meaning that does not exclude additional elements or parts of an assembly, subassembly, or structural element.

As used herein, the term "produced water" means brackish or saline water produced from a subterranean well. If not specified, water to be treated can be of any source, but is understood to not be suitable for well-treatment operations due to the presence of a substantial concentration of any one or more of: calcium and magnesium ions, iron ions; sulfate ions; and borate ions.

As used herein, the term "treated water" means and refers to water that has been treated according to any one of the various treatment systems or methods according to the invention, unless the context otherwise requires a reference to a specific stage or step of the treatment systems or methods of the invention.

As used herein, the term "treatment stream" means a flow of liquid moving continuously through any one of the treatment systems or methods according to the invention, starting with a stream of water, moving through the system or method, and ending with a stream of treated water.

As used herein, the terms "upstream" and "downstream" means with respect to the movement of the treatment stream through a treatment or system or method according to the invention, starting with a stream of water, moving "downstream" through the system or method, and ending with a stream of treated water.

As used herein, the term "water soluble" means at least 0.1 mol/L in distilled water when tested at standard temperature and pressure ("STP").

As used herein, a substantial concentration of sulfate ions is defined as being equal to or greater than 500 ppm; a substantial concentration of calcium or magnesium ions is defined as being equal to or greater than a combined total of 1,000 ppm; a substantial concentration of iron ions is defined as being equal to or greater than 10 ppm; a substantial concentration of borate is defined as being equal to or greater than 5 ppm.

If there is any conflict in the usages of a word or term in this specification and one or more patent or other documents that may be incorporated herein by reference, the definitions that are consistent with this specification should be adopted for the purposes of understanding this invention.

According to the invention, a mobile water treatment system for sufficiently treating water so that the treated water may be utilized in well-treatment operations is provided. The system comprises:

(a) a mobile platform;

(b) an input pump, wherein the input pump is mounted on the mobile platform and operatively connected to be capable of pumping a treatment stream through the system;

(c) a centrifugal separator, wherein the centrifugal separator is mounted on the mobile platform and operatively connected downstream of the input pump to centrifugally treat the treatment stream;

(d) a borate filter, wherein the borate filter is mounted on the mobile platform and operatively connected downstream of the centrifugal separator to filter the treatment stream, and wherein the borate filter is capable of removing at least some of a borate that may be present in the treatment stream when the treatment stream is at a pH of 8 or above; and (e) a chemical-additive subsystem, wherein the subsystem is mounted on the mobile platform, and wherein the subsystem is operatively connected to be capable of:

(i) selectively adding one or more chemical agents to the treatment stream upstream of the centrifugal separator, wherein the chemical agents can be selected to be capable of precipitating dissolved ions selected from the group consisting of: sulfate, calcium, strontium, or barium, magnesium, iron, and any combination thereof in any proportion that may be present in the treatment stream; and (ii) selectively adding a chemical agent to the treatment stream upstream of the borate filter to increase the pH of the treatment stream to 8 or above, wherein the pH increasing agent can be the same or different from one of the chemical agents that can be selected to be capable of precipitating dissolved sulfate, calcium, strontium, or barium, magnesium, or iron ions.

The chemical agents for adding to the treatment stream are selected from the group consisting of: a water-soluble calcium, strontium, or barium halide; a water-soluble carbonate; a water-soluble alkali metal hydroxide, and any combination thereof in any proportion. The calcium, strontium, or barium halide is selected for reacting with and precipitating sulfate ions as calcium, strontium, or barium sulfate, which is insoluble in water. The carbonate is selected for reacting with and precipitating dissolved calcium ions as calcium carbonate, which is insoluble in water. The hydroxide is selected for reacting with and precipitating magnesium and iron ions as magnesium and iron hydroxide, which are insoluble in water.

It should be understood, of course, that while these are the presently most preferred classes of chemical agents that can be selected for these various purposes, these are not necessarily the only classes that could be employed. For example, it is possible to precipitate sulfate with ammonium hydroxide to obtain water-insoluble ammonium sulfate precipitate, however, the use of ammonium compounds may create hazardous conditions with possible release of ammonia gas to the atmosphere.

The insoluble salt precipitates may remain in the treatment stream as suspended particulate. Downstream, at least some of this salt particulate, along with other particulate in the treatment stream from the water, is expected to be centrifugally removed from the treatment stream by the centrifugal separator.

The chemical agents for adding to the treatment stream preferably further include a flocculating agent to assist in agglomerating particulate, including the particulate caused by the precipitation of insoluble salts.

The chemical agent for increasing the pH of the treatment stream is selected to be capable of increasing the pH of the treatment stream to at least 8. More preferably, the pH increasing agent is selected to be capable of increasing the pH of the treatment fluid to the range of about 8.5-12. The pH increasing agent can be the same or different from one of the chemical agents selected to be capable of precipitating dissolved sulfate, calcium, strontium, or barium, magnesium, or iron ions.

In addition, it should be understood, of course, that it can be desirable to add the chemical agents in a particular order to the treatment stream. For example, it can be desirable to first add a chemical agent selected for being able to precipitate sulfate ions. If a calcium, strontium, or barium halide is employed to precipitate the sulfate ions, it can be desirable to add the carbonate downstream to precipitate calcium, strontium, or barium ions in solution. This may be to allow some time for mixing and reaction of the calcium, strontium, or barium halide with the dissolved sulfate ions prior to adding carbonate, which would otherwise likely pull some of the calcium, strontium, or barium halide out of solution in competition with the dissolved sulfate ions. By way of further example, if the pH is not sufficiently high for the borate filtration step from the upstream addition of the chemical agents employed for precipitating one or more of sulfate, calcium, strontium, or barium, magnesium, or iron ions prior to the centrifugal separator, then additional or different chemical agent can be added upstream of the borate filter for that purpose. In this regard, the additional or separate pH increasing agent can optionally be added to the treatment stream upstream of the centrifugal separator or anywhere between the centrifugal separator and the borate filter.

Further, it should be understood that adding a chemical agent that is capable of achieving at least some of a desired result or effect preferably includes that the chemical agent is to be added in a sufficient concentration to achieve substantially all of the desired result or effect. For example, a preferred concentration of calcium, strontium, or barium halide to be added to the treatment stream for the purpose of precipitating at least some of the dissolved sulfate ions in the treatment stream would be in the range of about 70%-110% on a Molar basis of the concentration of sulfate ions in the treatment stream, and more preferably in the range of about 90%-100% on a Molar basis. (The same is true for achieving the desired effect of precipitating at least some of any of the other divalent ions dissolved in the treatment stream, i.e., preferably a sufficient concentration of chemical agent is added to the treatment stream such that substantially all of the particular divalent ions dissolved in the treatment stream should be precipitated out of solution.) Because calcium, strontium, or barium ion of the calcium, strontium, or barium halide is itself a divalent ion, however, it is expected to be preferable not to use an excess of the calcium, strontium, or barium halide. In the alternative, however, any excess of the calcium, strontium, or barium ion concentration in the treatment stream from the addition of calcium, strontium, or barium halide can be removed with the downstream addition of sufficient carbonate.

Referring now to FIG. 1 of the drawing, a system according to the invention, generally referred to as the system 10, includes an input pump 12. The input pump is mounted on the mobile platform (not shown in FIG. 1) and operatively connected to be capable of pumping a treatment stream through the system 10. The input pump 12 can be operatively connected to draw water from a reservoir of water (not shown in FIG. 1), for example, via input piping 11 operatively connected to the input pump. The output of the pump 12 is pumped downstream through pump outlet piping 13. The input pump 12 should be a high-capacity pump, for example, capable of pumping up to about 20 barrels per minute ("BPM").

According to the presently most-preferred embodiment of a system 10 according to the invention, a chemical-additive subsystem 14 preferably comprises at least one liquid-additive pump, such as liquid-additive pump 14a, whereby various chemical agents in aqueous solution can be added to the treatment stream. The liquid additive pump 14a is relatively low capacity pumps compared to the input pump 12. For example, the liquid-additive pump 14a can be capable of pumping up to about 40 gallons per minute ("GPM"). According to the presently most-preferred embodiment of the invention, the various chemical agents to be added to the treatment stream are preferably dissolved in one or more aqueous solutions, which may be stored in one or more liquid storage tanks (not shown in FIG. 1). The liquid-additive pumps 14a can be operatively connected to such liquid storage tanks for chemical agents with suitable piping 15a.

The chemical-additive subsystem 14 further comprises a means for mixing a chemical agent with the treatment stream. Preferably, the means for mixing fluid streams from the liquid-additive pump 14a comprises suitable liquid-additive piping 15b for combining the liquid-additive streams with the treatment stream in piping 13. The means for mixing the fluid streams from the liquid-additive pump 14a may further comprise selectively operable valves (not shown in FIG. 1) to assist in combining the various fluid streams.

It should be understood by those of skill in the art that other types of chemical-additive mechanisms could be used, and such are contemplated by the present invention. For example, it is expected that solid chemical agents could be added using an auger dispensing system into the balancing tank 16, which is for balancing fluid flows of the treatment stream between the input pump 12 and the centrifugal separator 18.

Continuing to refer to FIG. 1, the system 10 preferably further comprises a balancing tank 16. According to the presently-preferred embodiment of system 10 shown in FIG. 1, the piping 13 directs the treatment stream to the balancing tank 16.

The balancing tank 16 is mounted on the mobile platform (not shown in FIG. 1) and operatively connected upstream of the centrifugal separator 18. The balancing tank 16 helps balance the treatment stream from the input pump 12 in the piping 13 into the balancing tank 16 with the treatment stream out of the balancing tank 16 via tank output piping 17 toward the centrifugal separator 18.

The balancing tank 16 should have sufficient volume to permit a non-uniform flow of liquid to be collected, mixed, and moved downstream at a more uniform rate. Pumping is controlled by level sensors in the balancing tank and the pumping rates varied according to the depth of liquid in the balancing tank.

The contents of the balancing tank 16 are preferably mixed to prevent the settlement of solids and to ensure that the liquid quality is as uniform as possible. To prevent anaerobic conditions and odors developing in the balancing tank 16, the contents of balancing tanks may need to be aerated. Venturi aerators can be used to mix and aerate, while mixing propellers can be used to keep solids in suspension as the treatment stream moves through the balancing tank 16.

In cases where the water contains a high concentration of solids, such as in a mud, the system 10 may optionally include a shaker separator (not shown in FIG. 1) operatively connected upstream of the centrifugal separator 18. Preferably, the shaker separator would be positioned upstream of the chemical-additive subsystem 14.

A shaker separator is well known in the oil and gas industry. A shaker separator is based on the operating principle of a vibrating sieve. A wire-cloth screen vibrates while a mud, such as a drilling fluid, flows on top of it. The liquid phase of the mud and solids smaller than the wire mesh tend to pass through the vibrating screen, while larger solids are retained on the screen. The vibrating screen is usually tilted relative to the horizontal such that the larger solids fall off a side of the shaker separator. Normally, the larger solids can be disposed of in a landfill without any further or special treatment. The size of the openings in the vibrating screen remove more solids from the whole mud, but decrease the flow rate per unit area of wire cloth.

Referring again to FIG. 1 of the drawing, the system 10 further includes a centrifugal separator 18. According to the presently-preferred embodiment of system 10 shown in FIG. 1, the piping 17 directs the treatment stream to the centrifugal separator 18.

The purpose of the centrifugal separator 18 is to remove relatively large particles from the treatment stream. Preferably, the centrifugal separator is capable of removing at least 50% of the particles larger than 300 microns that may be in the treatment stream. More preferably, the centrifugal separator is capable of removing at least 50% of the particles larger than 100 microns that may be in the treatment stream. It should be understood, of course, that the centrifugal separator can comprise a plurality of centrifugal separators to achieve a desired capacity of fluid flow and effectiveness.

Figure 2:
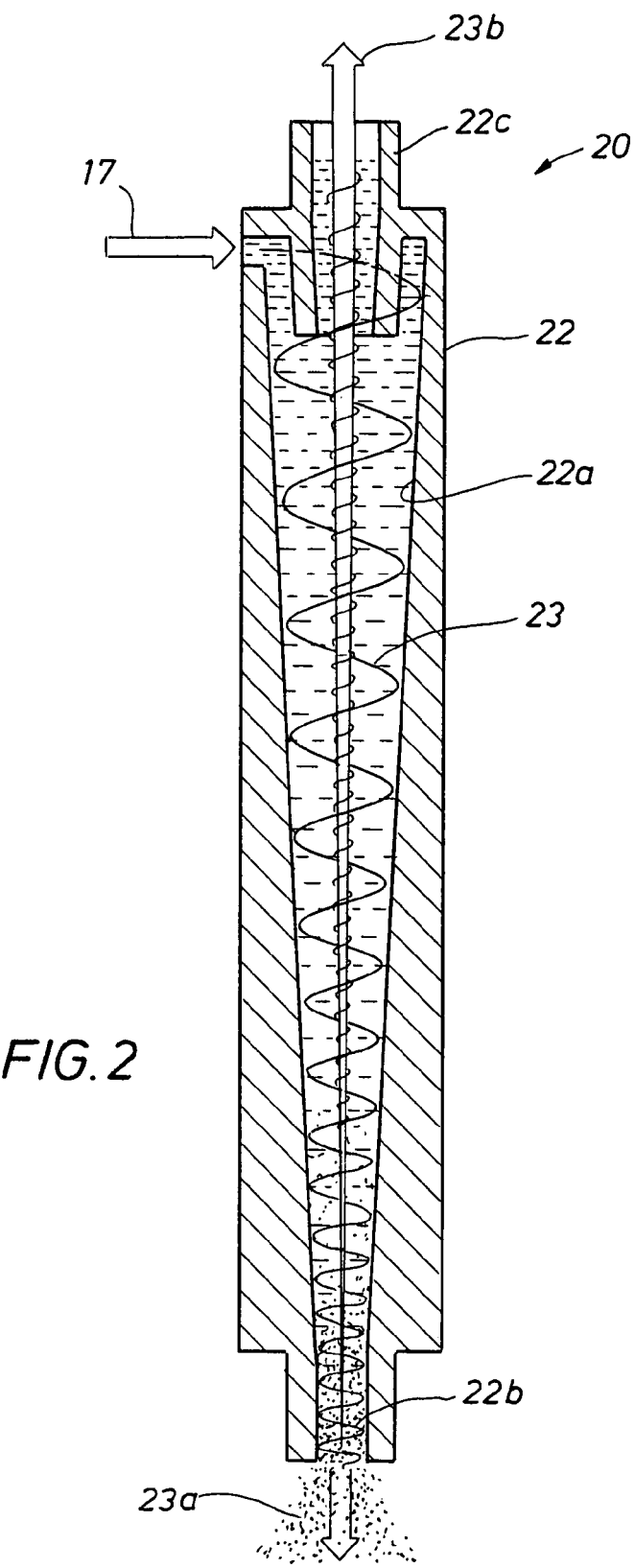
FIG. 2 is a representative example of the structure of a hydrocyclone, shown in cross-section.

According to the presently preferred embodiment of the system, the centrifugal separator 18 comprises a hydrocyclone 20, as illustrated in FIG. 2. A hydrocyclone is a well known type of centrifugal separator.

Referring briefly now to FIG. 2, a hydrocyclone 20 is illustrated. The basic operating principle of a hydrocyclone 20 is centrifugal force. Water containing solid particulates is fed tangentially into the body 22 of the hydrocyclone 20. The inner wall 22a of the body 22 of the hydrocyclone 22 is in the shape of a cone with a smaller open end or spigot 22b of the cone shape oriented downward. The tangentially fed water into the body 22 of the hydrocyclone causes a vortex fluid flow 23. Internally of the induced vertex fluid flow 23, the centrifugal force is countered by the resistance of the liquid, with the effect that relatively larger or denser solid particulates tend to be thrown to the inner wall 22a of the body 22 and to be discharged by gravity from the spigot 22b with a small amount of water as underflow 23a. Most of the water containing relatively fine solid particulates discharges from the upper end of the body 22 of the hydrocyclone 20 via the vortex finder 22c as overflow 23b.

The underflow 23a of fluid from the spigot 22b of the hydrocyclone body 22 tends to contain particles coarser than the cut point size. Normally, the underflow 23a can be disposed of in a disposal well or otherwise as may be practical.

The overflow 23b of fluid from the upper end of the hydrocyclone body 22 tends to contain relatively finer particles finer than the cut point size. The overflow 23b from the hydrocyclone 20 continues through a system or method according to the invention as part of the treatment stream. Referring back to FIG. 1, output of the centrifugal separator, for example the overflow 23b from a hydrocyclone 20, is directed downstream through outlet piping 19 from the centrifugal separator 18.

The "cut point size" of a hydrocyclone should be clearly defined. As used herein, for example, the term "d50 cut point" refers to the particle size at which the hydrocyclone is 50% efficient at removing particles. The cut point size does not refer to overflow products as this is dependant on the feed particle size analysis.

Preferably, the hydrocyclone 20 employed in a system or method according to the invention should have a d50 cut point at least down to about 300 microns. More preferably, the hydrocyclone should have a d50 cut point down to about 100 microns.

It should be understood, of course, that while the hydrocyclone is preferred, based on the sizes, throughput capacity, and economics of such centrifugal separation equipment, other types of centrifugal separators may be employed according to the principles of the invention. For example, if a centrifuge is employed for the centrifugal separator 18, a substantially dry cake of solid particulates is pulled out of the treatment stream, which can normally be disposed of in a landfill.

Figure 3:
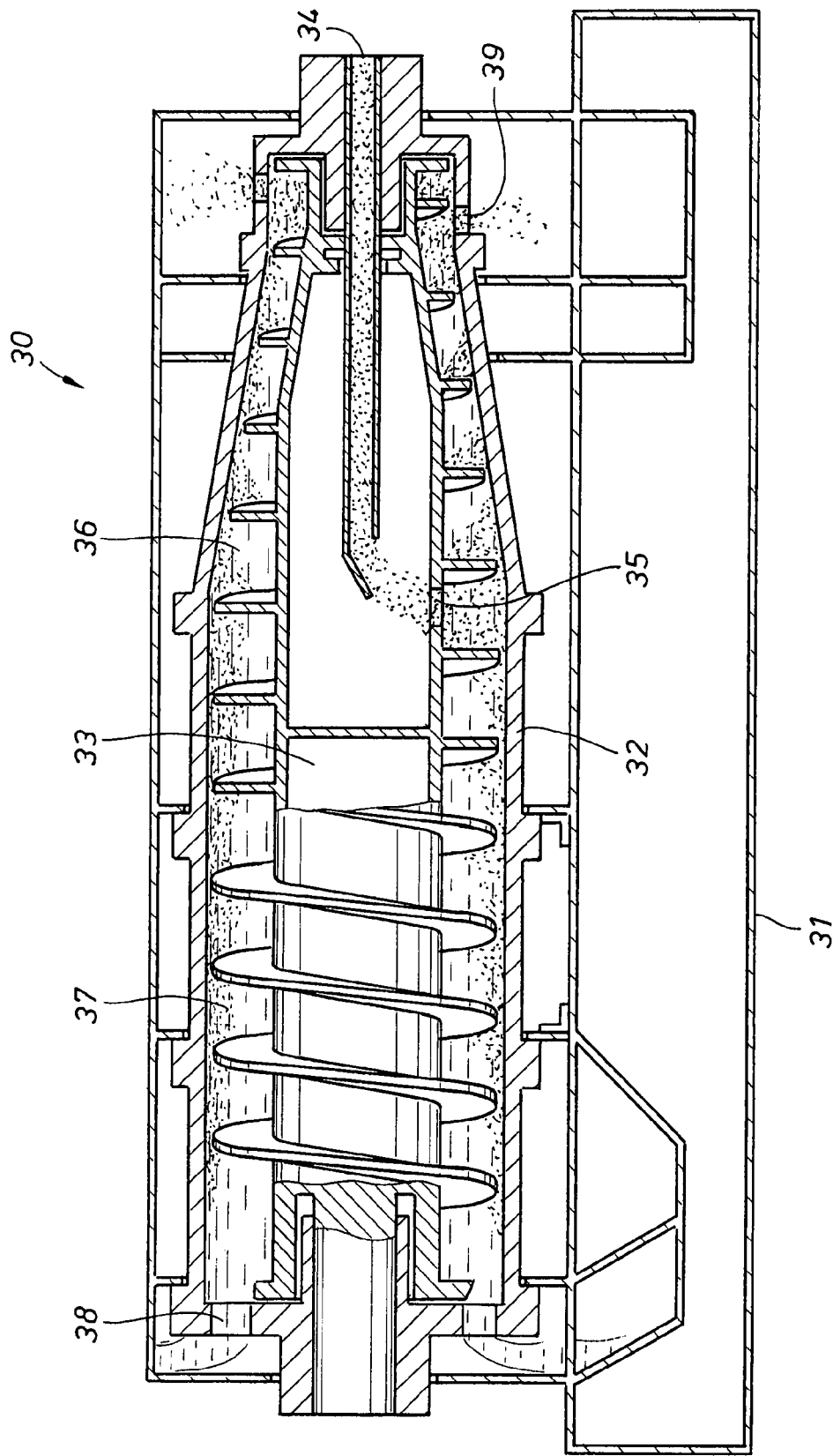
FIG. 3 is a representative example of the structure of a centrifuge, shown in cross-section.

Referring briefly now to FIG. 3, a centrifuge 30 is illustrated. The basic operating principle of a centrifuge 30 is centrifugal force. The centrifuge 30 is typically supported horizontally on a frame 31. The body of the centrifuge defines a generally cylindrical wall 32, and a screw-type conveyor 33. A relatively dirty water, sometimes referred to as a mud, is fed into inlet 34, which flows through an opening in the conveyor 33 to the space between the conveyor 33 and the cylindrical wall 32, which space is sometimes referred to as the bowl of the centrifuge. The rotation of the conveyor helps separate the particulate from the fluid in a region 36 known as the drying zone and fluid with a reduced particulate content moves through a liquid zone 37 toward outlet 38. Caked mud is expelled through the outlet 39.

Both these types of centrifugal separators, the hydrocyclone 20 and the centrifuge 30, are well known to those in such arts.

Referring again to FIG. 1 of the drawing, the system 10 preferably further includes a polish filter 40. According to the presently-preferred embodiment of system 10 shown in FIG. 1, the piping 19 directs the treatment stream to the polish filter 40.

The polish filter is mounted on the mobile platform (not shown in FIG. 1) and operatively connected between the centrifugal separator 18 and a borate filter 50, and wherein the polish filter 40 is capable of removing finer particulate sizes than the centrifugal separator is capable of removing. Preferably, the polish filter 40 is capable of removing particulate and precipitate sizes down to about 20 micron in size.

The polish filter 40 preferably has a mesh-bag as the filter media. More preferably, the polish filter 40 comprises at least two polish filters operatively connected in parallel, wherein centrifugally treated water is capable of being selectively directed away from one polish filter so that the media of that polish filter can be replaced while continuing to direct the stream of centrifugally treated water to one or more other polish filters. This provides the benefit of being able to change a mesh-bag of a mesh-bag type polish filter while continuing to pump the treatment stream through one or more other mesh-bag type polish filters. A removed mesh bag with particulate accumulated therein can normally be disposed of in a landfill.

According to another embodiment, the polish filter 40 comprises a backflushable tube filter, preferably having at least two backflushable filtration tube filters for being able to by-pass while backflushing one filtration tube to one or more other backflushable filtration tubes. When a tube is backflushed, a liquid sludge is produced that can be pumped down a disposal well or otherwise properly disposed of.

Output of the polish filter 40 is directed downstream through piping 41 toward the borate filter 50.

Referring to FIG. 1 of the drawing, the system 10 further includes a borate filter 40. According to the presently-preferred embodiment of system 10 shown in FIG. 1, the piping 41 directs the treatment stream to the borate filter 50.

The borate filter 50 is mounted on the mobile platform (not shown in FIG. 1) and operatively connected downstream of the centrifugal separator 18 to filter the treatment stream. The borate filter 50 is capable of removing at least some of a borate that may be present in the treatment stream when the treatment stream is at a pH of 8 or above. More preferably, the pH of the treatment stream during passage through the borate filter 50 is adjusted to be in the range of 8.5-12.

Filter media that is capable of removing borate from the treatment stream includes compounds that are capable of reacting with the borate. Such materials are preferably in a solid, water-insoluble form that can be maintained in a filter vessel while permitting the treatment stream to flow across the solid material, which should be placed or formed as a water-permeable filter media. It is presently believed that the cis-diols of cellulosic materials are ideal for labile addition of borate, which traps the borate with the cellulose. Another solid, water-insoluble material that is well known for reacting with borate is magnesium oxide.

The borate filter 50 preferably comprises a filter media comprising a cellulosic material. In certain embodiments, the filter media may comprise a cellulose material, a cellulose-based material, a cellulose material derived from cellulose pulp, and any combination thereof in any proportion. Certain embodiments of the cellulose-based material comprise a microcrystalline cellulose, a powdered or granular cellulose, a colloidal cellulose, a surface-modified cellulose, or any insoluble cellulose. Certain embodiments of the cellulose-based material may include chemically unmodified forms of cellulose including, but not limited to, saw dust, wood shavings, and compressed wood particles.

A removed filter media of cellulosic material with borate accumulated therein can normally be disposed of in a landfill.

According to another embodiment of the invention, the borate filter 50 can comprise a filter media wherein the filter media comprises magnesium oxide.

The borate filter 50 preferably comprises at least two borate filters operatively connected in parallel, wherein centrifugally treated water is capable of being selectively directed away from one borate filter so that the media of the borate filter can be replaced while continuing to direct the stream of centrifugally treated water to one or more other borate filters.

Additional information regarding an example of a filter and method of filtration for removing borate from a fluid stream is disclosed in U.S. Patent Application Publication Nos. US 2006/0186050 and US 2006/0186033, both published on Aug. 24, 2006, and both having for named inventors Robert E. Hanes, David E. Griffin, and David E. McMechan, each of which is incorporated herein by reference in its entirety.

Output of the borate filter 50 is directed downstream through piping 51 toward a treated fluid storage reservoir.

Preferably, the system 10 further comprises a post-filtration chemical-additive subsystem 60, wherein the post-filtration chemical-additive subsystem is mounted on the mobile platform, and wherein the subsystem is operatively connected to be capable of: selectively adding one or more chemical agents to the treatment stream downstream of the borate filter 50 between the borate filter and a storage reservoir for treated fluid. The chemical agents to be added downstream of the borate filter 50 can include, for example, a neutralizing agent to substantially neutralize the pH of the treatment stream, a bactericide, a surfactant, and any combination of the foregoing in any proportion.

According to the presently most-preferred embodiment of a system 10 according to the invention, a post borate-filter chemical-additive subsystem 60 preferably comprises at least one liquid-additive pump, such as liquid-additive pump 60a, whereby various chemical agents in aqueous solution can be added to the treatment stream. The liquid additive pump 60a is a relatively low capacity pump compared to the input pump 12. For example, the liquid-additive pump 50a can be capable of pumping up to about 5 gallons per minute ("GPM"). According to the presently most-preferred embodiment of the invention, the various chemical agents to be added to the treatment stream downstream of the borate filter 50 are preferably dissolved in one or more aqueous solutions, which may be stored in one or more liquid storage tanks (not shown in FIG. 1). The liquid-additive pump 60a can be operatively connected to such liquid storage tanks for chemical agents with suitable piping 61a.

The chemical-additive subsystem 60 further comprises a means for mixing a chemical agent with the treatment stream. Preferably, the means for mixing fluid streams from the liquid-additive pump 60a comprises suitable liquid-additive piping 61b for combining the liquid-additive streams with the treatment stream in piping 41. The means for mixing the fluid streams from the liquid-additive pump 60a can further comprise selectively operable valves (not shown in FIG. 1) to assist in combining the various fluid streams.

Similar to the previous description with regard to the chemical-additive subsystem 14, it should be understood by those of skill in the art that other types of chemical-additive mechanisms could be used for the chemical-additive subsystem 50, and such are contemplated by the present invention.

According to the invention, the system 10 preferably comprises appropriate fluid conduits or piping, such as piping 11, 13, 15a, 15b, 17, 19, 41, 51, 61a, and 61b, for operatively connecting together the various components of the system and for conducting the treatment stream through a system or method according to the invention.

The mobile platform can be any suitable platform. For off-shore operations, the mobile platform is a boat. For land-based operations, the mobile platform is a wheeled platform. For example, referring now to FIGS. 4 and 5, the mobile platform comprises at least one truck or trailer 70. Preferably, the mobile platform comprises one or more trailers. Preferably, the trailer is a semi trailer having wheels in the rear and adapted to be supported in the front by a towing vehicle when being moved. Preferably, the mobile platform further includes a tractor for towing the trailer.

Figure 4:
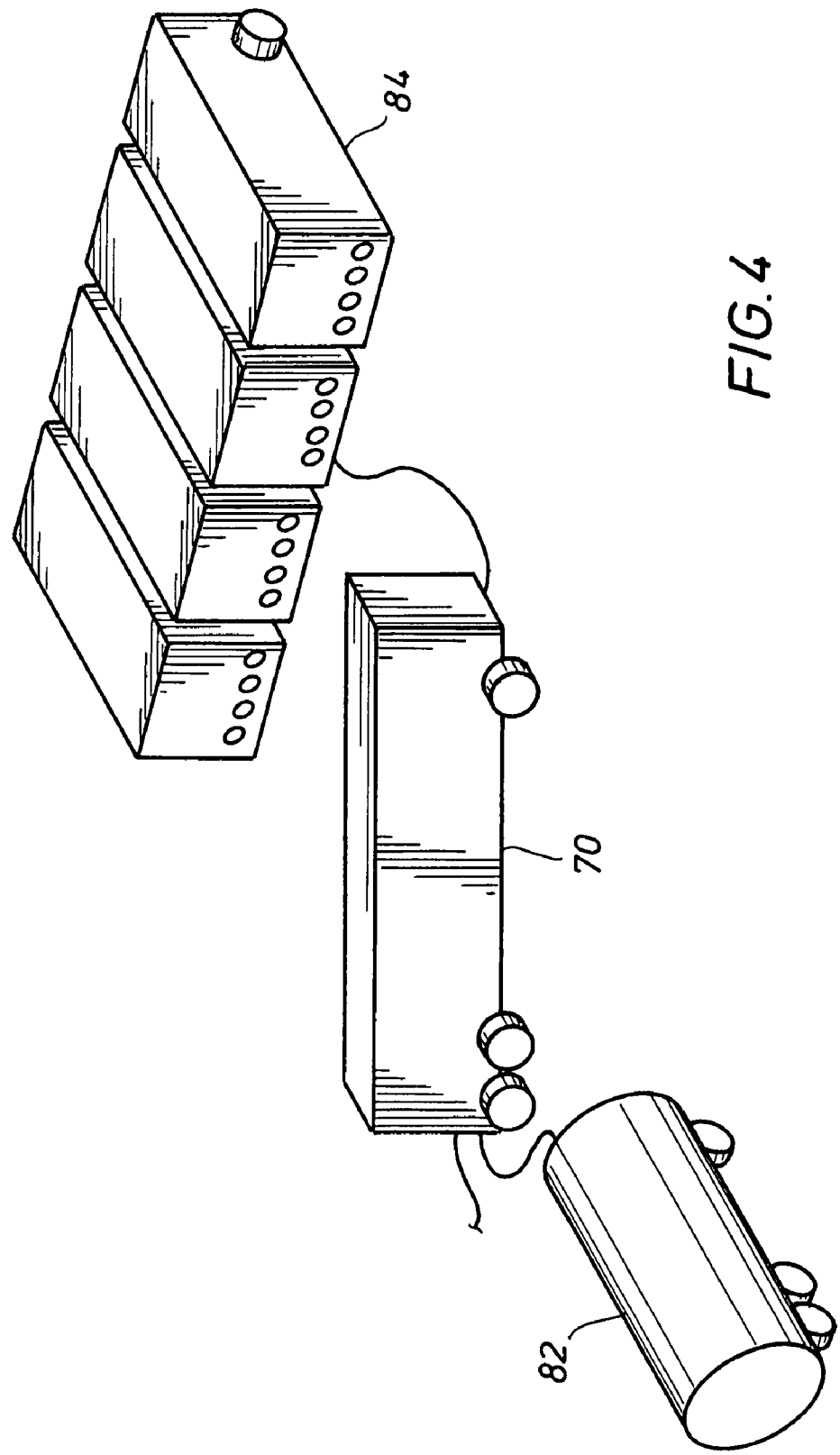
FIG. 4 is an illustration of a mobile water treatment system according to the invention, including a mobile water treatment system of the type represented in FIG. 1 mounted on a mobile platform (a trailer), and further including a reservoir of produced fluid (at least one tanker trailer) and a reservoir of treated fluid (at least one tank).
Figure 5:
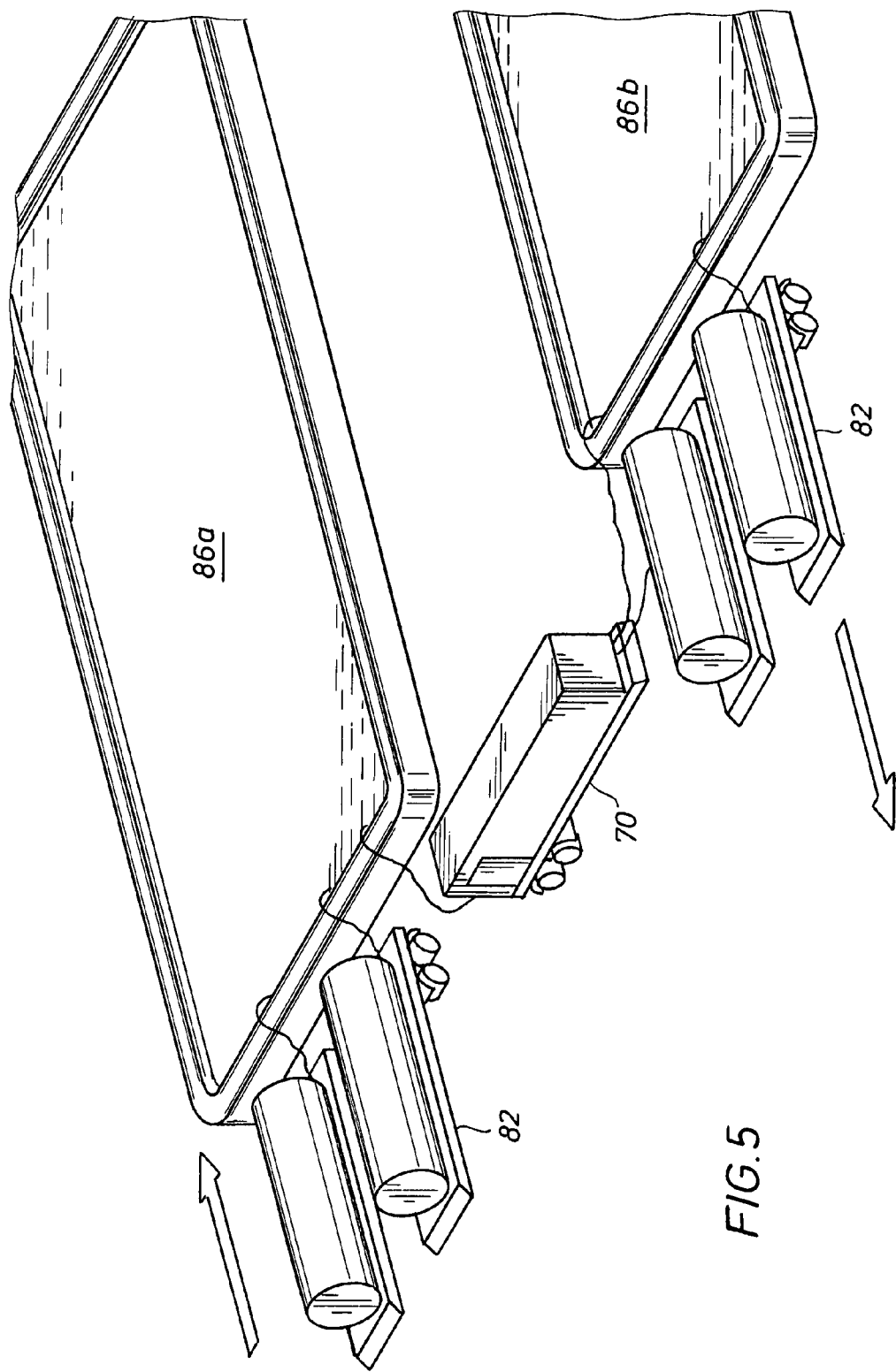
FIG. 5 is an illustration of another mobile water treatment system according to the invention, including a mobile water treatment system of the type represented in FIG. 1 mounted on a mobile platform (a trailer), and further including a reservoir of produced fluid (a holding pit) and a reservoir of treated fluid (a holding pit).

Continuing to refer now to FIGS. 4 and 5, the system can further comprise a reservoir for produced water (or other water source) and a reservoir for treated water. A reservoir can comprise, for example, a tank battery, a plurality of tank trucks or trailers, a holding pit, a pond, and any combination thereof. As shown in FIG. 4, the system can include a plurality of mobile tank trucks 82 for brining produced water (or another "dirty" water source) to an appropriate water treatment site, a trailer 70 for the water treatment equipment of the system, and a plurality of holding tanks 84 for the temporary storage of treated water, which is not necessarily potable but sufficiently "clean" for uses in well-treatment operations. As shown in FIG. 5, the system can include a plurality of tank trucks 82 for bringing produced water (or other water source) to a holding pit 86a, a trailer 70 for the water treatment equipment of the system, another holding pit 86b for the temporary storage of treated water, and a plurality of tank trucks 82 for taking treated water to a desired well location for use in well-treatment operations.

A method of water treatment for sufficiently treating water so that the treated water may be utilized in well-treatment operations is provided. According to this aspect, the method comprising the steps of: bringing a mobile water treatment system to a source of water; and using the mobile water treatment system to treat water to obtain treated water.

The method can further comprise the steps of: providing a reservoir for water, and providing a reservoir for the treated water.

The method can further comprise the step of: using the treated water in a well-treatment operation. As an example of a well-treatment operation which often requires a very large quantity of water, the step of using the treated water in a well-treatment operation can comprise fracturing a well. The systems and methods according the invention would have particular application and practical beneficial use in such fracturing operations.

According to another aspect of the invention, a method of water treatment for sufficiently treating water so that the treated water may be utilized in well-treatment operations is provided, wherein the method comprises the steps of:

(a) pumping water as part of a treatment stream;

(b) centrifugally removing at least some of the particulate that may be present in the treatment stream;

(c) filtering out at least some of the borate that may be present in the treatment stream with a filter media capable of removing a borate from the treatment stream at a pH of 8 or above, wherein at least during the step of filtering of borate, the pH of the treatment stream is or is adjusted to be 8 or above;

(d) adding a water-soluble calcium, strontium, or barium halide to the treatment stream upstream of the centrifugally removing step, wherein the calcium, strontium, or barium halide is capable of precipitating at least some of the sulfate ions dissolved in the treatment stream as calcium, strontium, or barium sulfate; and (e) adding a pH increasing agent to the treatment stream upstream of the borate filtering step, wherein the pH increasing agent is capable of increasing the pH of the treatment stream to at least 8.

This method preferably further includes the step of: adding a water-soluble alkali metal hydroxide to the treatment stream upstream of the centrifugally removing step, wherein the hydroxide is capable of precipitating at least some of the magnesium and iron ions dissolved in the treatment stream as magnesium and iron hydroxide.

According to another aspect of the invention, a method of water treatment for sufficiently treating water so that the treated water may be utilized in well-treatment operations is provided, wherein the method comprises the steps of:

(a) pumping water as part of a treatment stream;

(b) centrifugally removing at least some of the particulate that may be present in the treatment stream;

(c) filtering out at least some of the borate that may be present in the treatment stream with a filter media capable of removing a borate from the treatment stream at a pH of 8 or above, wherein at least during the step of filtering of borate, the pH of the treatment stream is or is adjusted to be 8 or above;

(d) adding a water-soluble carbonate to the treatment stream upstream of the centrifugally removing step, wherein the carbonate is capable of precipitating at least some of the calcium ions dissolved in the treatment stream as calcium carbonate; and (e) adding a pH increasing agent to the treatment stream upstream of the borate filtering step, wherein the pH increasing agent is capable of increasing the pH of the treatment stream to at least 8, and wherein the pH increasing agent can be the same or different from the carbonate selected to be capable of precipitating dissolved calcium ions.

This method preferably further includes the step of: adding a water-soluble alkali metal hydroxide to the treatment stream upstream of the centrifugally removing step, wherein the hydroxide is capable of precipitating at least some of the magnesium and iron ions dissolved in the treatment stream as magnesium and iron hydroxide, and wherein the pH increasing agent can be the same or different from the hydroxide selected to be capable of precipitating dissolved magnesium and iron ions.

According to yet another aspect of the invention, a method of water treatment for sufficiently treating water so that the treated water may be utilized in well-treatment operations is provided, wherein the method comprises the steps of:

(a) pumping water as part of a treatment stream;

(b) centrifugally removing at least some of the particulate that may be present in the treatment stream;

(c) filtering out at least some of the borate that may be present in the treatment stream with a filter media capable of removing a borate from the treatment stream at a pH of 8 or above, wherein at least during the step of filtering of borate, the pH of the treatment stream is or is adjusted to be 8 or above;

(d) adding a water-soluble alkali metal hydroxide to the treatment stream upstream of the centrifugally removing step, wherein the hydroxide is capable of precipitating at least some of the magnesium and iron ions dissolved in the treatment stream as magnesium and iron hydroxide; and (e) adding a pH increasing agent to the treatment stream upstream of the borate filtering step, wherein the pH increasing agent is capable of increasing the pH of the treatment stream to at least 8, and wherein the pH increasing agent can be the same or different from the carbonate selected to be capable of precipitating dissolved magnesium and iron ions.

This method can further comprise the step of: adding a water-soluble calcium, strontium, or barium halide to the treatment stream upstream of the centrifugally removing step, wherein the calcium, strontium, or barium halide is capable of precipitating at least some of the sulfate ions dissolved in the treatment stream as calcium, strontium, or barium sulfate. Additionally or alternatively, this method can further comprise the step of: adding a water-soluble carbonate to the treatment stream upstream of the centrifugally removing step, wherein the carbonate is capable of precipitating at least some of the calcium ions dissolved in the treatment stream as calcium carbonate; and wherein the pH increasing agent can be the same or different from the hydroxide selected to be capable of precipitating dissolved calcium ions.

According to still another aspect of the invention, a method of water treatment for sufficiently treating water so that the treated water may be utilized in well-treatment operations, wherein the method comprises the steps of:

(a) pumping water as part of a treatment stream;

(b) centrifugally removing at least some of the particulate that may be present in the treatment stream; and (c) filtering out at least some of the borate that may be present in the treatment stream with a filter media capable of removing a borate from the treatment stream at a pH of 8 or above, wherein at least during the step of filtering of borate, the pH of the treatment stream is or is adjusted to be 8 or above;

(d) chemically treating the treatment stream, wherein the step of chemically treating comprises at least one of the following steps:

(i) if sulfate is in any substantial concentration in the water, adding a water-soluble calcium, strontium, or barium halide to the treatment stream upstream of the centrifugally removing step, wherein the calcium, strontium, or barium halide is capable of precipitating at least some of the sulfate ions dissolved in the treatment stream as calcium, strontium, or barium sulfate;

(ii) if calcium is in any substantial concentration in the water, adding a water-soluble carbonate to the treatment stream upstream of the centrifugally removing step, wherein the carbonate is capable of precipitating at least some of the calcium ions dissolved in the treatment stream as calcium carbonate;

(iii) if magnesium, iron, or any combination thereof is in any substantial concentration in the water, adding a water-soluble alkali metal hydroxide to the treatment stream upstream of the centrifugally removing step, wherein the hydroxide is capable of precipitating at least some of the magnesium and iron ions dissolved in the treatment stream as magnesium and iron hydroxide; and (iv) if the pH of the treatment stream is not at least 8 or above at least during the borate filtering step, adding a pH increasing agent to the treatment stream upstream of the borate filtering step, wherein the pH increasing agent is capable of increasing the pH of the treatment stream to at least 8, and wherein the pH increasing agent can be the same or different from one of the chemical agents selected to be capable of precipitating dissolved calcium, strontium, or barium, magnesium, or iron ions.

As described herein, any of the methods according to the invention preferably further comprise the step of: chemically analyzing the treatment stream upstream of the centrifugally removing step for the concentration of at least sulfate and calcium ions. More preferably, the methods further include the step of chemically analyzing the treatment stream for the concentrations of magnesium and iron ions. Most preferably, the methods further include the step of chemically analyzing the treatment stream for the concentration of borate. It can also be desirable to chemically analyze the treated water to determine and confirm the effectiveness of the methods. Still further, the analyses can also include particle size analyses. Such analytical information may also be useful to help in troubleshooting and maintenance, for example, to determine when a filter media should be replaced with fresh filter media.

The methods preferably further comprise the step of adding a flocculating agent to the treatment stream upstream of the centrifugally removing step to help agglomerate particulate prior to the centrifugally removing step.

The methods preferably further comprise the step of bringing a mobile treatment system for practicing the steps of the method to a source of water or to a reservoir of water.

The methods preferably further comprise the step of balancing the treatment stream from the input pump with the treatment stream to the centrifugal removing step.

In any of the methods according to the invention, the centrifugally removing step preferably comprises using a hydrocyclone.

The methods preferably further comprise a step of polish filtering the treatment stream between the centrifugally removing step and the borate filtering step, wherein the polish filtering step removes finer sizes of particulate than the centrifugal removing step.

In any of the methods, the borate filtering step preferably comprises using a filter media comprising a water-insoluble cellulosic material. The cellulosic material is preferably selected from the group consisting of: a cellulose-based material, a cellulose material derived from cellulose pulp, and any combination thereof in any proportion.

The methods preferably further comprise the steps of: providing a reservoir for water, and providing a reservoir for the treated water.

The methods preferably further comprise the step of: using the treated water in a well-treatment operation. The step of using the treated water in a well-treatment operation comprises: fracturing a well.

It should be understood, of course, that two or more of the various preferred elements or steps of the invention are more advantageously practiced together to increase the efficiency and benefits that can be obtained from the invention.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A method of water treatment for sufficiently treating produced water containing particulate and borate so that the treated water may be utilized in well-treatment operations, the method comprising the steps of:
   (a) pumping said water as part of a treatment stream;
   (b) centrifugally removing at least some of the particulate present in the treatment stream; and
   (c) filtering out at least some of the borate in the treatment stream with a filter media capable of removing a borate from the treatment stream at a pH of 8 or above, wherein at least during the step of filtering of borate, the pH of the treatment stream is or is adjusted to be 8 or above;
   (d) chemically treating the treatment stream, to precipitate sulfate, calcium, magnesium, or iron ions wherein the step of chemically treating comprises at least one of the following steps:
      (i) adding a water-soluble calcium, strontium, or barium halide to the treatment stream upstream of the centrifugally removing step, wherein the calcium, strontium, or barium halide is capable of precipitating at least some of the sulfate ions dissolved in the treatment stream as calcium, strontium, or barium sulfate;
      (ii) adding a water-soluble carbonate to the treatment stream upstream of the centrifugally removing step, wherein the carbonate is capable of precipitating at least some of the calcium ions dissolved in the treatment stream as calcium carbonate; and
      (iii) adding a water-soluble alkali metal hydroxide to the treatment stream upstream of the centrifugally removing step, wherein the hydroxide is capable of precipitating at least some of the magnesium and iron ions dissolved in the treatment stream as magnesium and iron hydroxide, wherein at least some of the precipitated sulfate, calcium, magnesium, or iron ions is removed with said particulate in step (b); and
   (e) using the filtered water in a well-treatment operation, wherein the filtered water is not suitable for use as freshwater or potable water.

2. The method according to claim 1, further comprising the step of: chemically analyzing the water for the concentration of at least sulfate and calcium, ions.

3. The method according to claim 1, further comprising the step of adding a flocculating agent to the treatment stream upstream of the centrifugally removing step to help agglomerate particulate prior to the centrifugally removing step.

4. The method according to claims 1, further comprising the step of bringing a mobile treatment system for practicing the steps of the method to a source of water.

5. The method according to claim 1, further comprising the step of balancing the treatment stream from the input pump with the treatment stream to the centrifugal removing step.

6. The method according to claim 1, wherein the centrifugally removing step comprises using a hydrocyclone.

7. The method according to claim 1, further comprising a step of polish filtering the treatment stream between the centrifugally removing step and the borate filtering step, wherein the polish filtering step removes finer sizes of particulate than the centrifugal removing step.

8. The method according to claim 1, wherein the borate filtering step comprises using a filter media comprising a water-insoluble cellulosic material.

9. The method according to claim 8, wherein the cellulosic material is selected from the group consisting of: a cellulose-based material, a cellulose material derived from cellulose pulp, and any combination thereof in any proportion.

10. The method according to claim 1, further comprising the steps of: providing a reservoir for water, and providing a reservoir for the treated water.

11. The method according to claim 1, wherein the step of using the treated water in a well-treatment operation comprises: fracturing a well.

12. A method of water treatment for sufficiently treating produced water containing particulate and borate so that the treated water may be utilized in well-treatment operations, the method comprising the steps of:
   (a) pumping said water as part of a treatment stream;
   (b) centrifugally removing at least some of the particulate present in the treatment stream;
   (c) filtering out at least some of the borate in the treatment stream with a filter media capable of removing a borate from the treatment stream at a pH of 8 or above, wherein at least during the step of filtering of borate, the pH of the treatment stream is or is adjusted to be 8 or above;
   (d) adding a water-soluble calcium, strontium, or barium halide to the treatment stream upstream of the centrifugally removing step, wherein the calcium, strontium, or barium halide is capable of precipitating at least some of the sulfate ions dissolved in the treatment stream as calcium, strontium, or barium sulfate, wherein at least some of the precipitated sulfate is removed with said particulate in step (b);
   (e) adding a pH increasing agent to the treatment stream upstream of the borate filtering step, wherein the pH increasing agent is capable of increasing the pH of the treatment stream to at least 8; and
   (f) using the filtered water in a well-treatment operation, wherein the filtered water is not suitable for use as freshwater or potable water.

13. The method according to claim 12, further comprising the step of: adding a water-soluble alkali metal hydroxide to the treatment stream upstream of the centrifugally removing step, wherein the hydroxide is capable of precipitating at least some of magnesium and iron ions dissolved in the treatment stream as magnesium and iron hydroxide.

14. A method of water treatment for sufficiently treating produced water containing particulate and borate so that the treated water may be utilized in well-treatment operations, the method comprising the steps of:
   (a) pumping said water as part of a treatment stream;
   (b) centrifugally removing at least some of the particulate present in the treatment stream;
   (c) filtering out at least some of the borate in the treatment stream with a filter media capable of removing a borate from the treatment stream at a pH of 8 or above, wherein at least during the step of filtering of borate, the pH of the treatment stream is or is adjusted to be 8 or above;
   (d) adding a water-soluble carbonate to the treatment stream upstream of the centrifugally removing step, wherein the carbonate is capable of precipitating at least some of the calcium ions dissolved in the treatment stream as calcium carbonate, wherein at least some of the precipitated carbonate is removed with said particulate in step (b); and
   (e) adding a pH increasing agent to the treatment stream upstream of the borate filtering step, wherein the pH increasing agent is capable of increasing the pH of the treatment stream to at least 8, and wherein the pH increasing agent can be the same or different from the carbonate selected to be capable of precipitating dissolved calcium ions; and (f) using the filtered water in a well-treatment operation, wherein the filtered water is not suitable for use as freshwater or potable water.

15. The method according to claim 14, further comprising the step of: adding a water-soluble alkali metal hydroxide to the treatment stream upstream of the centrifugally removing step, wherein the hydroxide is capable of precipitating at least some of magnesium and iron ions dissolved in the treatment stream as magnesium and iron hydroxide, and wherein the pH increasing agent can be the same or different from the hydroxide selected to be capable of precipitating dissolved magnesium and iron ions.

16. A method of produced water containing particulate and borate treatment for sufficiently treating water so that the treated water may be utilized in well-treatment operations, the method comprising the steps of:

(a) pumping said water as part of a treatment stream;

(b) centrifugally removing at least some of the particulate present in the treatment stream;

(c) filtering out at least some of the borate in the treatment stream with a filter media capable of removing a borate from the treatment stream at a pH of 8 or above, wherein at least during the step of filtering of borate, the pH of the treatment stream is or is adjusted to be 8 or above;

(d) adding a water-soluble alkali metal hydroxide to the treatment stream upstream of the centrifugally removing step, wherein the hydroxide is capable of precipitating at least some of the magnesium and iron ions dissolved in the treatment stream as magnesium and iron hydroxide, wherein at least some of the precipitated magnesium and iron hydroxide is removed with said particulate in step (b); and (e) adding a pH increasing agent to the treatment stream upstream of the borate filtering step, wherein the pH increasing agent is capable of increasing the pH of the treatment stream to at least 8, and wherein the pH increasing agent can be the same or different from the carbonate selected to be capable of precipitating dissolved magnesium and iron ions; and (f) using the filtered water in a well-treatment operation, wherein the filtered water is not suitable for use as freshwater or potable water.

17. The method according to claim 16, further comprising the step of: adding a water-soluble calcium, strontium, or barium halide to the treatment stream upstream of the centrifugally removing step, wherein the calcium, strontium, or barium is capable of precipitating at least some of sulfate ions dissolved in the treatment stream as calcium, strontium, or barium sulfate.

18. The method according to claim 16, further comprising the step of: adding a water-soluble carbonate to the treatment stream upstream of the centrifugally removing step, wherein the carbonate is capable of precipitating at least some of calcium ions dissolved in the treatment stream as calcium carbonate; and wherein the pH increasing agent can be the same or different from the hydroxide selected to be capable of precipitating dissolved calcium ions.

* * * * *